United States Patent
Nakamura et al.

(10) Patent No.: US 11,765,042 B2
(45) Date of Patent: Sep. 19, 2023

(54) TRAFFIC APPLICATION AMOUNT CALCULATION APPARATUS, METHOD AND PROGRAM

(71) Applicant: Nippon Telegraph and Telephone Corporation, Tokyo (JP)

(72) Inventors: Mizuto Nakamura, Musashino (JP); Toshihiko Seki, Musashino (JP); Naoyuki Tanji, Musashino (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 17/793,875

(22) PCT Filed: Jan. 22, 2020

(86) PCT No.: PCT/JP2020/002086
§ 371 (c)(1),
(2) Date: Jul. 19, 2022

(87) PCT Pub. No.: WO2021/149182
PCT Pub. Date: Jul. 29, 2021

(65) Prior Publication Data
US 2023/0113776 A1    Apr. 13, 2023

(51) Int. Cl.
*H04L 41/142* (2022.01)
*H04L 43/062* (2022.01)

(52) U.S. Cl.
CPC ......... *H04L 41/142* (2013.01); *H04L 43/062* (2013.01)

(58) Field of Classification Search
CPC ....... H04L 43/08; H04L 43/16; H04L 41/145; H04L 63/1425; H04L 43/0894;
(Continued)

(56) References Cited

U.S. PATENT DOCUMENTS

| 2010/0177658 A1* | 7/2010 | Arai ................. H04L 43/16 370/252 |
| 2016/0234069 A1* | 8/2016 | Coudurier .......... H04L 41/5025 |

(Continued)

FOREIGN PATENT DOCUMENTS

| JP | 5695767 | 2/2015 |
| JP | 5723334 | 4/2015 |

OTHER PUBLICATIONS

Uwe Gotzner, 1998, Spatial Traffic Distribution in Cellular Networks 1998, IEEE, 0-7803-4320-4 0 1998 EEE.* [No Author Listed] [online], "CDP Settings," Cisco Aironet Access Point CiscoIOS Software Configuration Guide, Jun. 29, 2017, retrieved from URL <https://www.cisco.com/c/ja_jp/td/docs/w1/accesspoint/aironet1260/cg/001/12-4-25d/scg12-4-25d-ja-chap17-cdp.html>, 13 pages (with English Translation).

(Continued)

*Primary Examiner* — Djenane M Bayard
(74) *Attorney, Agent, or Firm* — Fish & Richardson P.C.

(57) ABSTRACT

A traffic application amount calculation device 14 includes a calculation unit 143 that uses traffic data flowing to an IF of a NW device to calculate, in the IF, an average traffic amount in a transmission direction and an average traffic amount in a reception direction, a first arithmetic operation unit 145 that selects a direction in which an average traffic amount is smaller out of the transmission direction and the reception direction and calculates a standard deviation of the traffic amount in a selected direction that is selected, and a second arithmetic operation unit 146 that determines a traffic amount obtained by multiplying the standard deviation by a predetermined value as a traffic application amount to be applied to traffic in the selected direction.

9 Claims, 8 Drawing Sheets

(58) Field of Classification Search
CPC ... H04L 67/52; H04L 41/142; H04L 43/0811; H04L 12/5692; H04L 47/122; H04L 43/00; H04L 47/20; H04L 41/082; H04L 43/10; H04L 63/1416; H04L 43/0876; H04L 41/147; H04L 43/0882; H04L 63/1408; H04L 43/026; H04L 43/04; H04L 63/1458; H04L 41/12; H04L 43/50; H04L 47/10; H04L 47/125; H04L 63/145; H04L 41/0896; H04L 41/16; H04L 12/44; H04L 43/0852; H04L 43/0864; H04L 67/12; H04L 43/062; H04L 43/067; H04L 43/0817; H04L 43/0888; H04L 41/14; H04L 67/535; H04L 12/5691; H04L 41/5009; H04L 43/12; H04L 45/22; H04L 47/22; H04L 47/70; H04L 5/0064; H04L 5/0094; H04L 43/045; H04L 43/20; H04L 45/70; H04L 51/18; H04L 63/083; H04L 63/102; H04L 1/0002; H04L 1/008; H04L 12/1818; H04L 12/1827; H04L 41/0893
See application file for complete search history.

(56) References Cited

U.S. PATENT DOCUMENTS

2017/0264558 A1\* 9/2017 Higuchi ................. H04L 1/203
2018/0184443 A1\* 6/2018 Li ..................... H04W 72/1273

OTHER PUBLICATIONS

[No Author Listed] [online], "Feature Description of LLDP," Users' Guide of ApresiaNP Series, retrieved on May 10, 2022, retrieved from URL <https://www.apresia.jp/products/ent/np/usersguide/management/top.html?p=NP_lldp_c_fc.html>, 7 pages (with English Translation).

Nakamura et al., "A Study on Estimation Accuracy Improvement Method of Topology Estimation Using Traffic Information," IEICE 2019 General Conference Preprint, Mar. 2019, 3 pages (with English Translation).

Nakamura et al., "Study on investigation of accuracy improvement methods in configuration management technology using traffic information," IEICE Technical Report, 2019, 119(111):59-64, 13 pages (with English Translation).

\* cited by examiner

TRAFFIC APPLICATION AMOUNT CALCULATION APPARATUS, METHOD AND PROGRAM

CROSS-REFERENCE TO RELATED APPLICATIONS

This application is a National Stage application under 35 U.S.C. § 371 of International Application No. PCT/JP2020/002086, having an International Filing Date of Jan. 22, 2020, the disclosure of which is considered part of the disclosure of this application, and is incorporated in its entirety into this application.

TECHNICAL FIELD

The present disclosure relates to a traffic application amount calculation device, a traffic application amount calculation method, and a traffic application amount calculation program.

BACKGROUND ART

In network (NW) operation work in carriers, it is necessary to quickly specify failure locations and ascertain the influence when failures occur. All of this is carried out based on configuration information. The configuration information is information relating to the current status of a NW configuration (a connection relation between a NW device and a NW device). And managing latest configuration information is referred to as configuration management. Because the current status of a NW changes dynamically in its configurations due to expansion, reduction, switching, or the like, correct configuration management is important in order to maintain and operate the NW.

In a case where configuration management is performed, for example, a link layer discovery protocol (LLDP) is used. The LLDP is a L2 protocol used to acquire device adjacency information (see NPL 1). A device that provides information periodically transmits LLDP packets to a multicast address, and a device that collects information receives the LLDP packets to collect information. However, the LLDP is only implemented in some vendor products, and is limited in its use depending on the operation policy of a device.

In addition, Cisco Discovery Protocol (CDP) is used for the same purpose (see NPL 2). However, CDP is a device detection protocol capable of being executed by a NW device made by Cisco Systems, Inc., and cannot be used in other vendor products.

Consequently, PTLs 1 and 2 disclose a topology estimation device that estimates an interface (IF) connection relation between NW devices. The topology estimation device compares the transmitted and received traffic amount of time-series data acquired from each IF of each NW device by taking a difference for each acquisition time (for example, 10:00, 10:15, . . . ) and estimates IFs having the smallest or matching differences as an IF connection relation.

For example, the topology estimation device acquires the transmitted traffic amount (in) and the received traffic amount (out) of each IF of each NW device from the traffic collection device, calculates $\{IF_i(t) \cdot in - IF_j(t) \cdot out\}$ and $\{IF_j(t) \cdot in - IF_i(t) \cdot out\}$ for two different $IF_i$ and $IF_j$, and calculates a difference between two difference values. The topology estimation device performs the same calculation for all IFs between different NW devices, and estimates IFs having the smallest difference as an IF connection relation.

The topology estimation device estimates the IF connection relation by comparing differences between traffic amounts, and thus can estimate the IF connection relation with a high level of accuracy between IFs in which traffic having a characteristic change over time is flowing. On the other hand, it is difficult to perform correct estimation in a case where there are a plurality of IFs in which little traffic having a change over time with similar characteristics is flowing or a case where there is an IF in which traffic having an almost constant value is flowing regardless of a time slot (for example, an IF of a backup device).

Consequently, NPL 3 proposes a method of improving the estimation accuracy of a topology estimation technique by imparting a feature amount by a traffic application device applying test traffic to an IF that is a target for traffic application determined by a traffic application IF determination device. For example, in a NW device in which traffic having a constant value is flowing in each IF, different feature amounts are imparted by applying test traffic while shifting a timing.

CITATION LIST

Patent Literature

PTL 1: JP 5695767 B
PTL 2: JP 5723334 B

Non Patent Literature

NPL 1: "Functional description of LLDP", ApresiaNP Series User's Guide, [accessed on Jan. 10, 2020], the Internet <URL: https://www.apresia.jp/products/ent/np/usersguide/management/top.html?p=NP_lldp_c_fc.html>
NPL 2: "Overview of CDP", Cisco Aironet Access Point Cisco IOS Software Configuration Guide, [accessed on Jan. 10, 2020], the Internet <URL: https://www.cisco.com/c/ja_jp/td/docs/wl/accesspoint/aironet1260/cg/001/12-4-25d/scg12-4-25d-ja-chap17-cdp.html>
NPL 3: Nakamura and four others, "Study on Investigation of Accuracy Improvement Methods in Configuration Management Technology using traffic information", The Institute of Electronics, Information and Communication Engineers, IEICE Technical Report, 2019 General Conference, B-14-11, March 2019, p. 59-p. 64

SUMMARY OF THE INVENTION

Technical Problem

However, the traffic application device disclosed in NPL 1 merely imparts a feature by applying test traffic. Thus, there has been a problem in that, depending on the application amount of test traffic, the application amount may be excessive or the application amount may be insufficient to impart a feature.

The present disclosure is contrived in view of such circumstances, and an object of the present disclosure is to provide a technique capable of calculating an appropriate amount of traffic application.

Means for Solving the Problem

According to an aspect of the present disclosure, there is provided a traffic application amount calculation device including a calculation unit that uses traffic data flowing to an IF of a NW device to calculate, in the IF, an average traffic amount in a transmission direction and an average traffic amount in a reception direction, a first arithmetic operation unit that selects a direction in which an average traffic amount is smaller out of the transmission direction and the reception direction and calculates a standard deviation of a traffic amount in a selected direction that is selected, and a second arithmetic operation unit that determines a traffic amount obtained by multiplying the standard deviation by a predetermined value as a traffic application amount to be applied to traffic in the selected direction.

According to an aspect of the present disclosure, there is provided a traffic application amount calculation method including using traffic data flowing to an IF of a NW device to calculate, in the IF, an average traffic amount in a transmission direction and an average traffic amount in a reception direction, selecting a direction in which an average traffic amount is smaller out of the transmission direction and the reception direction and calculating a standard deviation of a traffic amount in a selected direction that is selected, and determining a traffic amount obtained by multiplying the standard deviation by a predetermined value as a traffic application amount to be applied to traffic in the selected direction.

According to an aspect of the present disclosure, there is provided a traffic application amount calculation program causing a computer to operate as the traffic application amount calculation device.

Effects of the Invention

According to the present disclosure, it is possible to provide a technique capable of calculating an appropriate amount of traffic application.

DESCRIPTION OF EMBODIMENTS

Hereinafter, an embodiment of the present disclosure will be described with reference to the accompanying drawings. In the description of the drawings, the same portions are denoted by the same reference numerals and signs, and the description thereof will be omitted.

SUMMARY OF THE INVENTION

In order to solve the above problem, a method of determining an appropriate amount of traffic application according to an actually flowing traffic amount is required in consideration of a load on a NW or a load on a NW device. Consequently, the present disclosure discloses a traffic application amount calculation device having a function of calculating an appropriate amount of traffic application from an actually flowing traffic amount.

In a case where the values of traffic amounts flowing to IFs are constant, it can be assumed that a difference in traffic flow rate between the IFs is small and the values are approximately equal to each other. Thus, it is only necessary to apply traffic having a minimum amount of traffic enough to make that the difference in traffic flow rate becomes identifiable. Consequently, the traffic application amount calculation device uses traffic data that is actually flowing to an IF that is a target for traffic application determined by a traffic application IF determination device to analyze the average amount or variance value of traffic transmitted and received by the IF that is a target for traffic application and to calculate a minimum amount of traffic application that can be distinguished from other IFs. Thereafter, the traffic application amount calculation device notifies a traffic application device of the calculated minimum amount of traffic application. The traffic application device applies test traffic having the minimum amount of traffic application that has been notified of to the IF that is a target for traffic application.

Topology Estimation System

Figure 1:
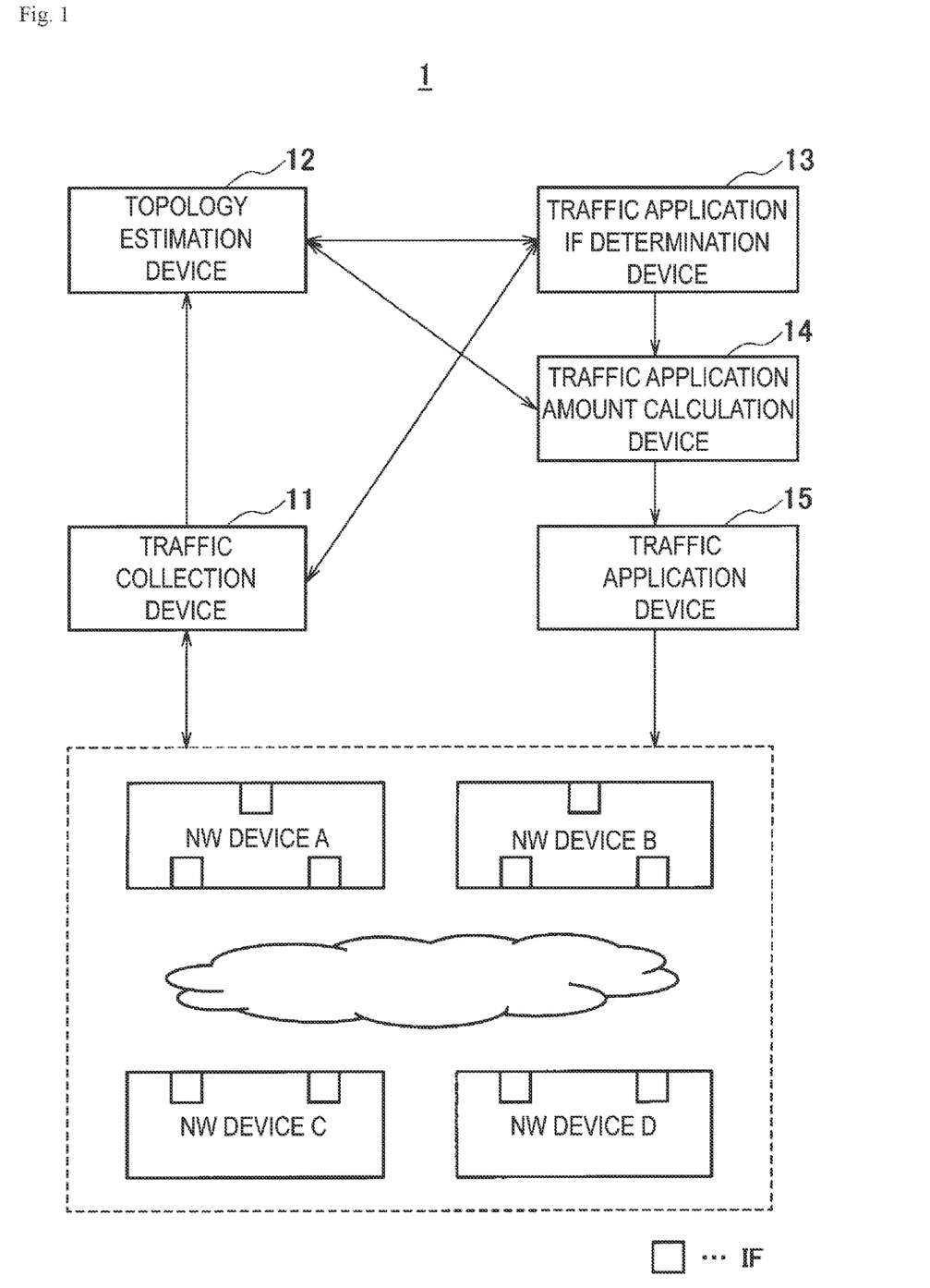
FIG. 1 is a configuration diagram illustrating the entirety of a topology estimation system according to the present embodiment.

FIG. 1 is a configuration diagram illustrating the entirety of a topology estimation system 1 according to the present embodiment. The topology estimation system 1 includes a traffic collection device 11, and a topology estimation device 12, a traffic application IF determination device 13, a traffic application amount calculation device 14, and a traffic application device 15.

The traffic collection device 11 is a device that collects traffic data (transmitted and received traffic amount) of each IF from each NW device that is a target for topology estimation.

The topology estimation device 12 is a device that compares the transmitted and received traffic amount of time-series data collected from each IF of each NW device by taking a difference for each acquisition time (for example, 10:00, 10:15, . . . ) and estimates IFs having the smallest or matching differences as an IF connection relation. For example, the topology estimation device 12 acquires the transmitted traffic amount (in) and the received traffic amount (out) of each IF of each NW device from the traffic collection device 11, calculates $\{IF_i(t)\cdot in - IF_j(t)\cdot out\}$ and $\{IF_j(t)\cdot in - IF_i(t)\cdot out\}$ for two different $IF_i$ and $IF_j$, and calculates a difference between two difference values. The topology estimation device 12 performs the same calculation for all IFs between different NW devices, and estimates IFs having the smallest difference as an IF connection relation.

The traffic application IF determination device 13 is a device that uses the traffic data acquired from the traffic collection device 11 based on a difference in traffic amount between the IFs calculated during the estimation of the IF connection relation in the topology estimation device 12 to determine an IF that is a target for traffic application and transmits the determined IF that is a target for traffic application and its traffic data to the traffic application amount calculation device 14.

The traffic application amount calculation device 14 is a device that uses the above-described traffic data for the IF that is a target for traffic application determined by the traffic application IF determination device 13 to analyze the average amount or variance value of traffic transmitted and received by the IF that is a target for traffic application and to calculate a minimum amount of traffic application that can be distinguished from other IFs.

The traffic application device 15 is a device that imparts a feature amount by applying test traffic having the minimum amount of traffic application calculated by the traffic application amount calculation device 14 to the IF that is a target for traffic application determined by the traffic application IF determination device 13.

Configuration of Traffic Application Amount Calculation Device

Figure 2:
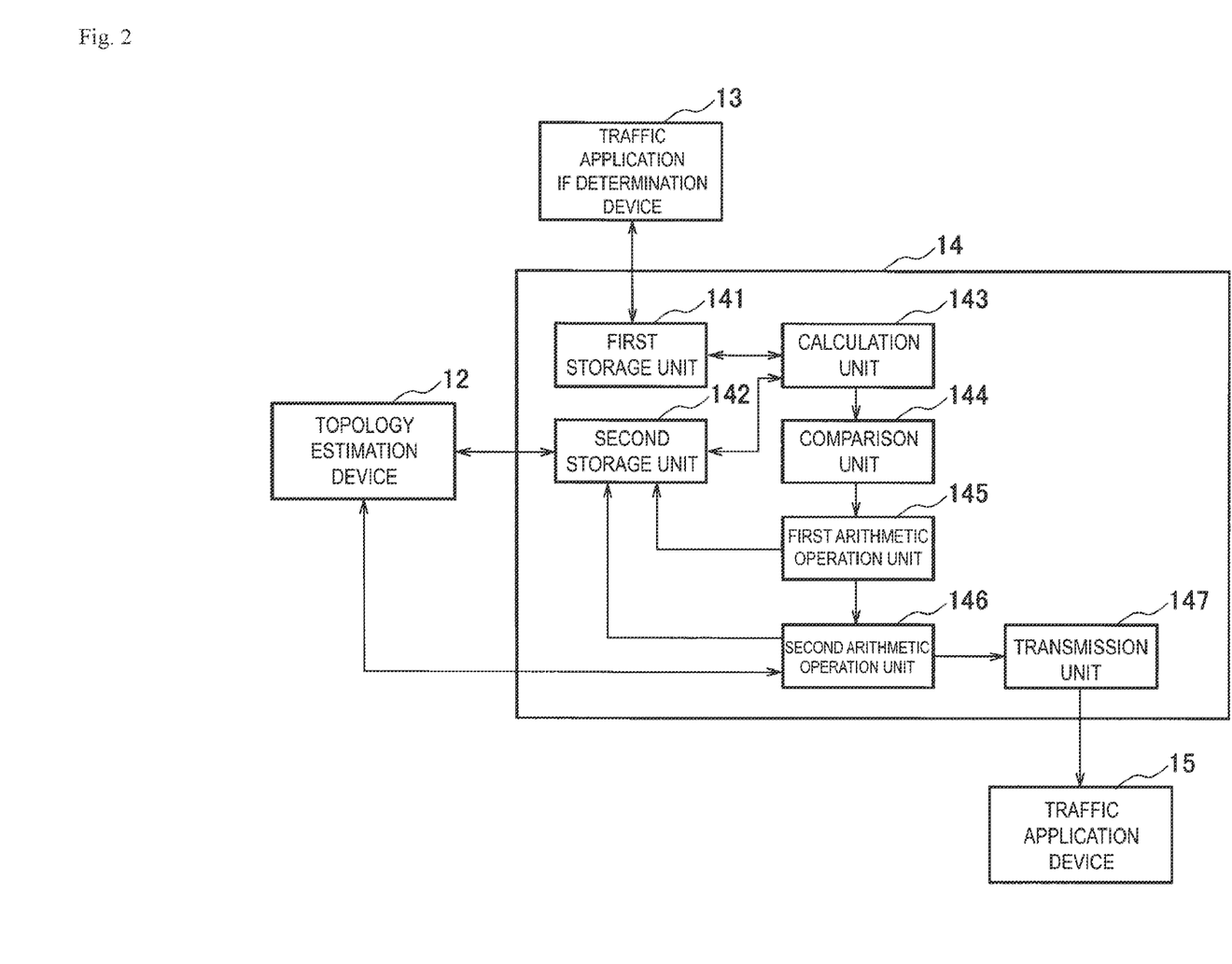
FIG. 2 is a block diagram illustrating a functional configuration of a traffic application amount calculation device.

FIG. 2 is a block diagram illustrating a functional configuration of the traffic application amount calculation device 14 according to the present embodiment. The traffic application amount calculation device 14 includes a first storage unit 141, a second storage unit 142, a calculation unit 143, a comparison unit 144, a first arithmetic operation unit 145, a second arithmetic operation unit 146, and a transmission unit 147.

The first storage unit 141 has a function of storing IF information of an IF that is a target for traffic application transmitted from the traffic application IF determination device 13 and traffic data flowing to each IF of a plurality of NW devices. Meanwhile, the traffic data may be acquired from the traffic collection device 11 or the topology estimation device 12.

The second storage unit 142 has a function of storing traffic information or the like. The traffic information is, for example, information in which the minimum amount of traffic application calculated by the second arithmetic operation unit 146, IF information of an IF to which test traffic of the traffic application amount is applied, the application direction of the IF to which the test traffic of the traffic application amount is applied, and a time at which these are transmitted to the traffic application device 15 (a time of application of the test traffic) are associated with each other.

The calculation unit 143 has a function of reading out the traffic data from the first storage unit 141 and using the traffic amount at each time included in the traffic data to calculate an average traffic amount in the transmission direction and an average traffic amount in the reception direction in an IF.

The comparison unit 144 has a function of comparing the average traffic amount in the transmission direction and the average traffic amount in the reception direction which are calculated by the calculation unit 143.

The first arithmetic operation unit 145 has a function of selecting a direction in which the average traffic amount is smaller out of the transmission direction and the reception direction from a result of comparison of the average traffic amounts performed by the comparison unit 144 and calculating the standard deviation of the traffic amount in the selected direction.

The second arithmetic operation unit 146 has a function of determining a traffic amount obtained by multiplying the standard deviation calculated by the first arithmetic operation unit 145 by a predetermined value as a traffic application amount to be applied to traffic in the selected direction. In addition, the second arithmetic operation unit 146 has a function of determining, in a case where the determined traffic application amount exceeds the upper limit amount of the NW band of the IF, a value obtained by subtracting the maximum value of the traffic amount flowing in the selected direction from the upper limit amount as a traffic application amount.

The transmission unit 147 has a function of transmitting data of the traffic application amount determined by the second arithmetic operation unit 146 to the traffic application device 15 together with the IF information of the IF that is a target for traffic application and the selected direction (the application direction of the test traffic).

Operation of Traffic Application Amount Calculation Device

Figure 3:
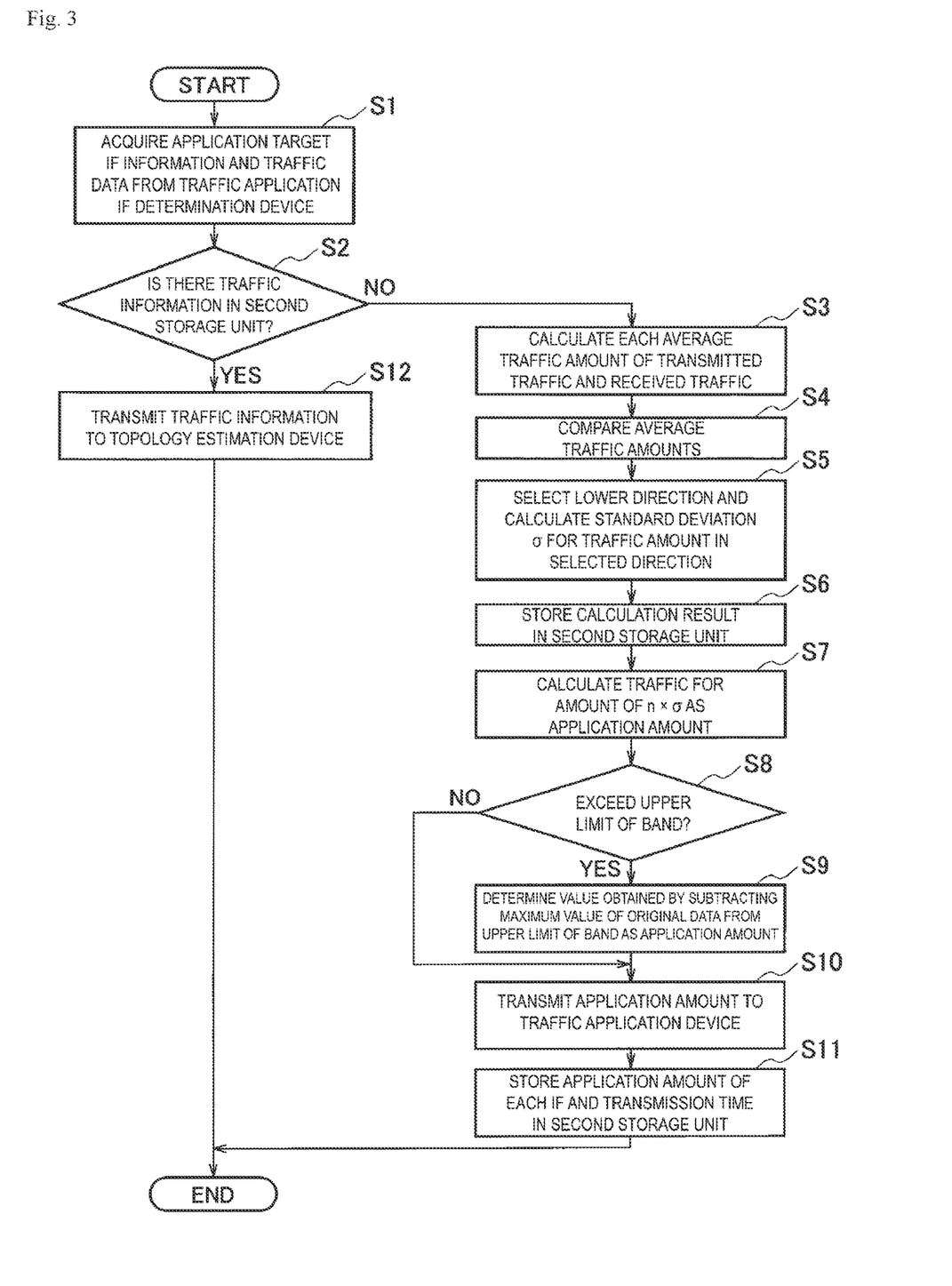
FIG. 3 is a flowchart illustrating an example of an operation of the traffic application amount calculation device.

FIG. 3 is a flowchart illustrating an example of an operation of the traffic application amount calculation device 14.

Step S1;

First, the first storage unit 141 stores the IF information of the IF that is a target for traffic application acquired by the traffic application amount calculation device 14 from the traffic application IF determination device 13 and the traffic data flowing to each IF of a plurality of NW devices. The traffic application amount calculation device 14 may acquire the traffic data from the traffic collection device 11 or the topology estimation device 12.

Step S2;

Next, the calculation unit 143 determines whether the second storage unit 142 has traffic information (information in which the minimum amount of traffic application calculated by the second arithmetic operation unit 146, IF information of an IF to which test traffic of the traffic application amount is applied, the application direction of the IF to which the test traffic of the traffic application amount is applied, and a time at which these are transmitted to the traffic application device 15 (a time of application of the test traffic) are associated with each other). In a case where the second storage unit 142 has no traffic information, the processing operations of steps S3 to S11 are performed. In a case where the second storage unit 142 has traffic information, the processing of step S12 is performed.

Figure 4:
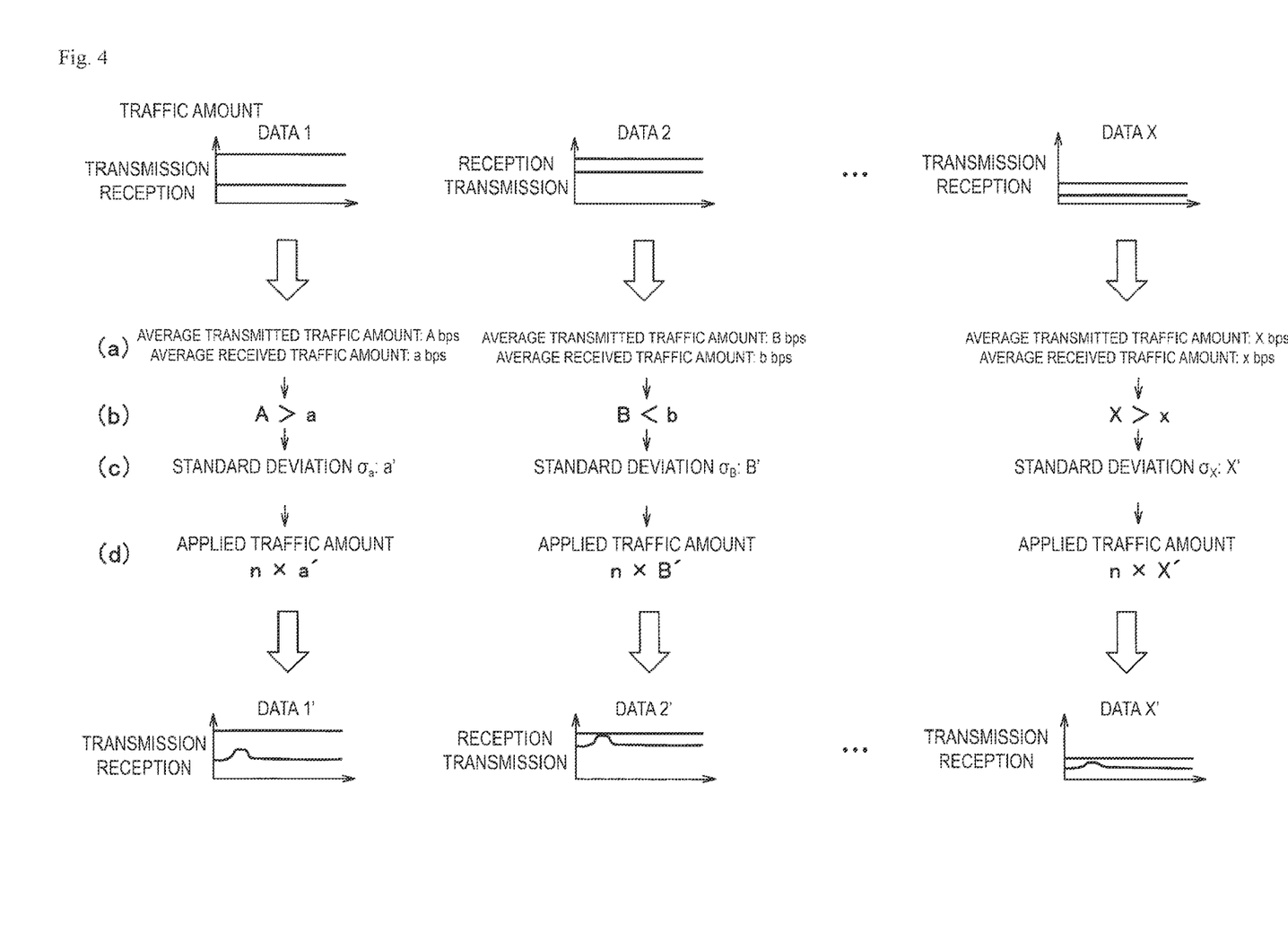
FIG. 4 is a reference diagram for describing the operation of the traffic application amount calculation device.

Step S3;

Next, the calculation unit 143 reads out the traffic data from the first storage unit 141 and uses the traffic amount at each time included in the traffic data to calculate the average traffic amount in the transmission direction and the average traffic amount in the reception direction in each IF of the plurality of NW devices (see FIG. 4(a)).

Step S4;

Next, the comparison unit 144 compares the average traffic amount in the transmission direction and the average traffic amount in the reception direction for each IF of the plurality of NW devices (see FIG. 4(b)).

Step S5;

Next, the first arithmetic operation unit 145 selects a direction in which the average traffic amount is smaller among the transmission direction and the reception direction for each IF of the plurality of NW devices, and calculates the standard deviation a of the traffic amount in the selected direction (see FIG. 4(c)). For example, when the traffic amount at a time t in the selected direction is set to xi and the number of traffic amounts is set to n, an average p is obtained by calculating $(1/n)\Sigma_{t=1}^{n} x_t$. A variance $\sigma^2$ is then obtained by calculating $(1/n)\Sigma_{t=1}^{n}(x_t-\mu)^2$, and the standard deviation $\sigma$ is obtained by calculating the square root of the variance $\sigma^2$. Meanwhile, in a case where the average traffic amount in the transmission direction and the average traffic amount in the reception direction are equal to each other (for example, all 0 bps or the like), either traffic amount is selected. The direction to be selected may be determined in advance or may be random.

Step S6;

Next, the first arithmetic operation unit 145 stores the standard deviation a of the traffic amount of each IF calculated in step S5 in the second storage unit 142.

Step S7;

Next, the second arithmetic operation unit 146 multiplies the standard deviation σ calculated in step S5 n times (n is an any constant) for each IF of the plurality of NW devices, and determines a traffic amount for the amount of n×σ as a traffic application amount to be applied to traffic in the selected direction (see FIG. 4(d)). At this time, in a case where the standard deviation σ calculated in step S5 is 0, a preset constant amount of traffic is determined to be a traffic application amount in order to prevent the traffic application amount from being set to 0 in spite of being an IF that is a target for traffic application. Meanwhile, the value of n is freely set by a NW to be managed. For example, the second arithmetic operation unit 146 acquires and uses the value of n which is set in the topology estimation device 12.

This makes it possible to apply test traffic having an index amount according to a variation between the average traffic amount and the traffic amount, and thus it is possible to prevent the traffic application of an excessive amount of traffic.

Step S8;

Next, the second arithmetic operation unit 146 determines whether the traffic application amount (=n×σ) determined in step S7 exceeds the upper limit amount of the NW band of the IF for each IF of the plurality of NW devices. In a case where the traffic application amount exceeds the upper limit amount of the NW band, step S9 is performed and then the processing proceeds to step S10. In a case where the traffic application amount does not exceed the upper limit amount of the NW band, step S9 is skipped and the processing proceeds to step S10.

Figure 5:
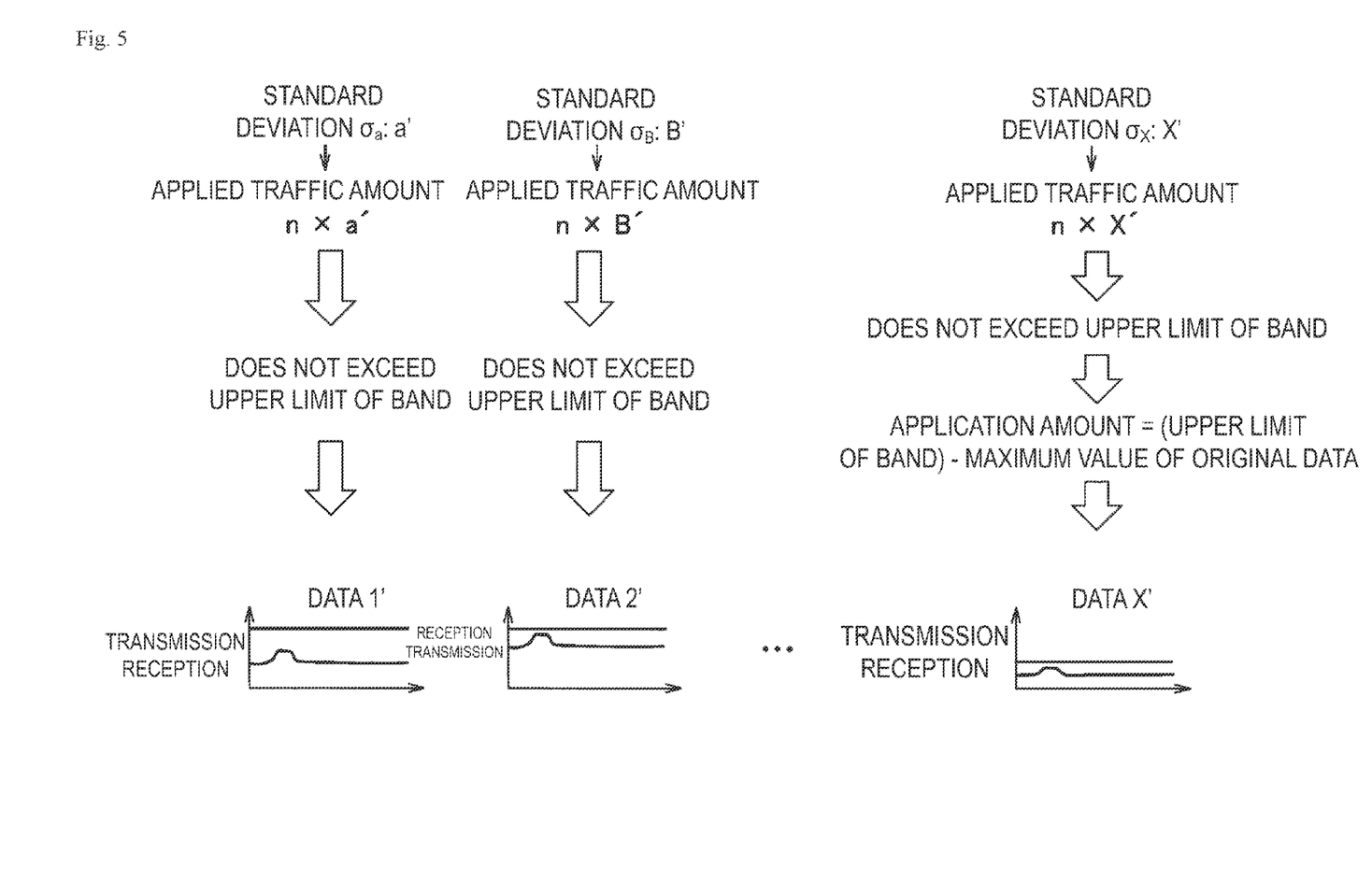
FIG. 5 is a reference diagram for describing the operation of the traffic application amount calculation device.

Step S9;

In a case where the traffic application amount determined in step S7 exceeds the upper limit amount of the NW band, in applying the test traffic, an upper limit is set to the calculation result so as not to exceed an original communication band (for example, 1 Gbps in the case of gigabit Ethernet (GbitEther) such as 1000BASE-T) when test traffic having the amount of n×σ is applied. For example, the second arithmetic operation unit 146 determines a value obtained by subtracting the maximum value of the traffic amount flowing in the selected direction from the upper limit amount of the NW band (=the upper limit of band of the IF−the maximum value of original data) as a traffic application amount for an IF in which the traffic application amount determined in step S7 exceeds the upper limit amount of the NW band of the IF (see FIG. 5). Meanwhile, the upper limit of the band of each IF may refer to information registered during the design of an NW, or in a case where there is a naming rule such as GigabitEther or 10G in the naming rule of a registered name in a configuration information DB of each IF, the upper limit of the band may refer thereto.

Step S10;

Next, the transmission unit 147 transmits data of the traffic application amount determined in steps S7 and S9 to the traffic application device 15 together with the IF information of the IF that is a target for traffic application and the selected direction (the application direction of the test traffic).

Thereafter, the traffic application device 15 applies test traffic of the traffic application amount to traffic in the selected direction. In addition, the topology estimation device 12 estimates the IF connection relation of each IF of each NW device using the traffic data collected after the application of the test traffic.

Figure 6:
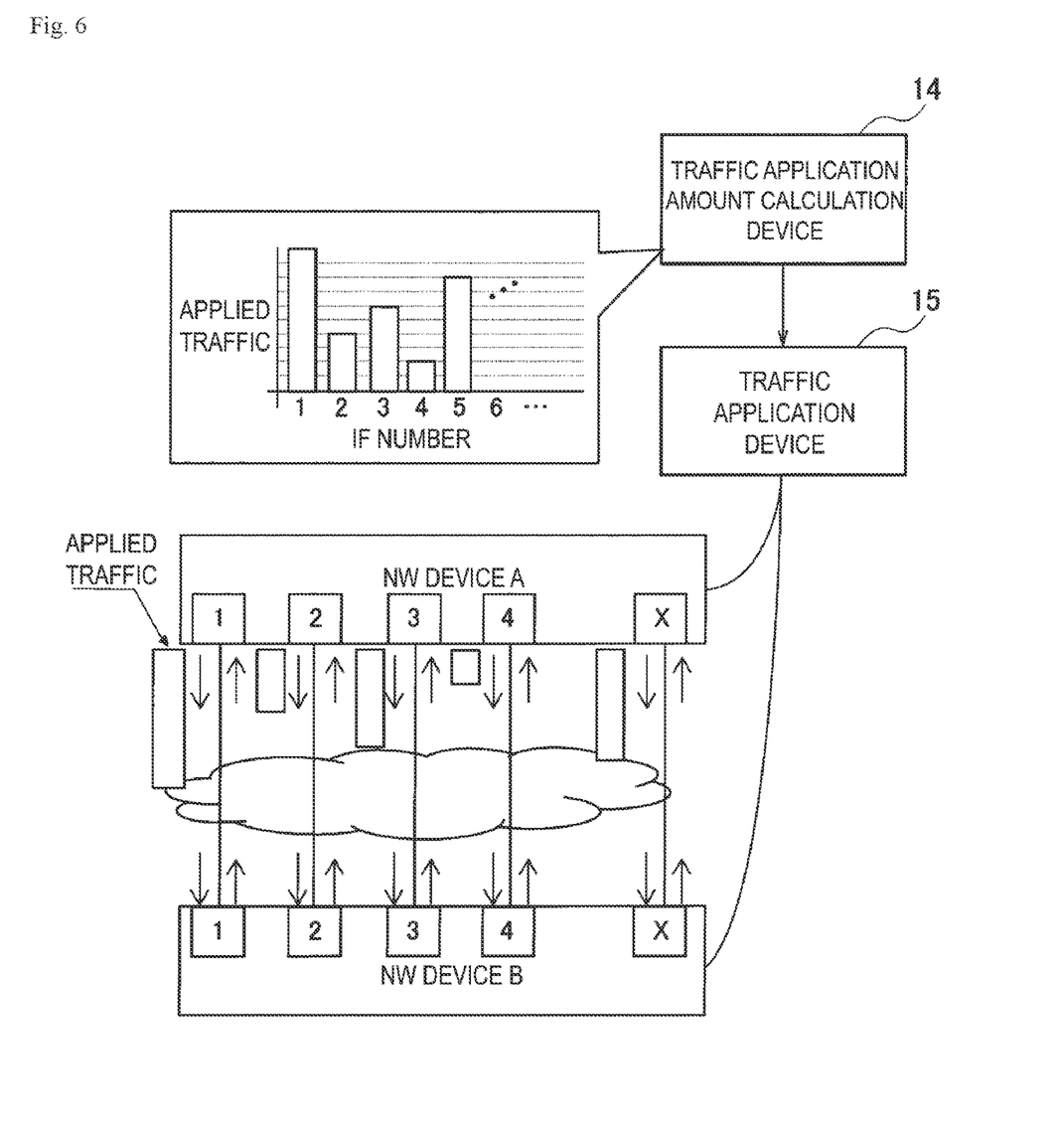
FIG. 6 is a reference diagram for describing a function of storing traffic information.

Step S11;

Thereafter, the second storage unit 142 stores the traffic application amount determined in steps S7 and S9, the IF number of the IF to which the test traffic having the traffic application amount is applied, the application direction (selected direction) of the IF to which the test traffic having the traffic application amount is applied, and a time at which these are transmitted to the traffic application device 15 (a time of application of the test traffic) as traffic information in association with each other (see FIG. 6).

Step S12;

In a case where the second storage unit 142 has traffic information in step S2, the calculation unit 143 transmits the traffic information to the traffic application device 15 and the topology estimation device 12. Thereby, the traffic application device 15 prevents the test traffic from being applied again to the IF to which the test traffic has been applied based on the traffic information, for example, in a case where a specified time has not elapsed from the time of its application. This makes it possible to prevent the test traffic from being applied excessively (such as, for example, being applied multiple times).

Effects

Figure 7:
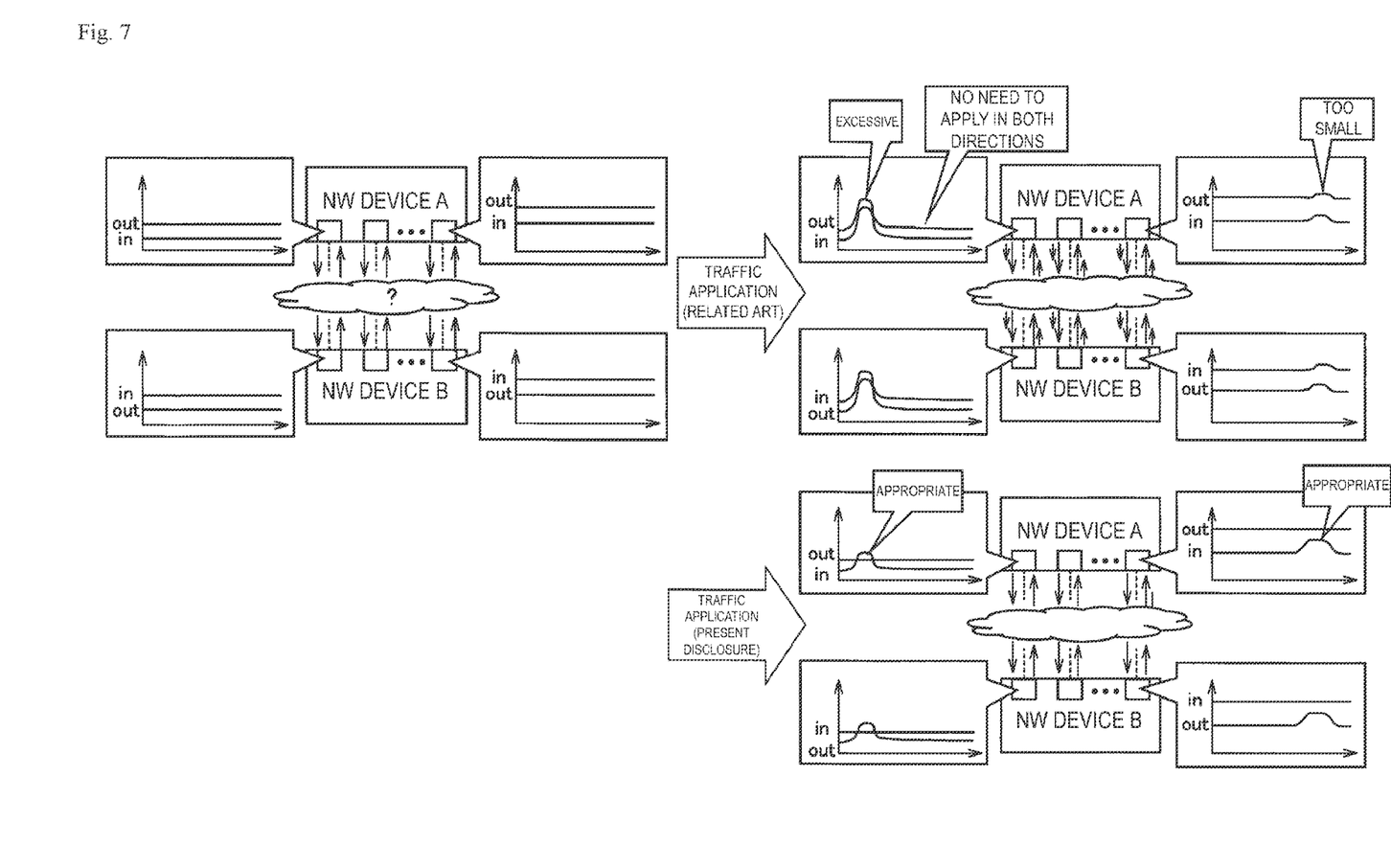
FIG. 7 is a reference diagram for describing the effect of the present embodiment.

According to the present embodiment, in the traffic application amount calculation device 14, the calculation unit 143 uses traffic data flowing to an IF of a NW device to calculate, in the IF, an average traffic amount in a transmission direction and an average traffic amount in a reception direction, the first arithmetic operation unit 145 selects a direction in which an average traffic amount is smaller out of the transmission direction and the reception direction and calculates a standard deviation of a traffic amount in a selected direction that is selected, and the second arithmetic operation unit 146 determines a traffic amount obtained by multiplying the standard deviation by a predetermined value as a traffic application amount to be applied to traffic in the selected direction. Thus, according to the present embodiment, it is possible to provide a technique capable of calculating an appropriate amount of traffic application. As illustrated in FIG. 7, in the related art, there are a case where the amount of application is excessive, and a case where the amount of application is insufficient to impart a feature and the test traffic is further applied in both directions of transmission and reception, but in the present embodiment, an appropriate amount of test traffic can be applied.

In addition, according to the present embodiment, in a case where the traffic application amount exceeds an upper limit amount of a NW band of the IF, the second arithmetic operation unit 146 determines a value obtained by subtracting a maximum value of a traffic amount flowing in the selected direction from the upper limit amount as a traffic application amount. Thus, according to the present embodiment, it is possible to provide a technique capable of calculating a more appropriate amount of traffic application.

In addition, according to the present embodiment, the second storage unit 142 stores traffic information in which IF information of an IF to which traffic having the traffic application amount is applied and a time of application of the traffic are associated with each other. Thus, according to the present embodiment, it is possible to utilize the traffic information and to prevent the test traffic from being applied excessively.

Others

Meanwhile, the present disclosure is not limited to the above embodiment and can be modified and changed variously without departing from the scope of the present disclosure.

Figure 8:
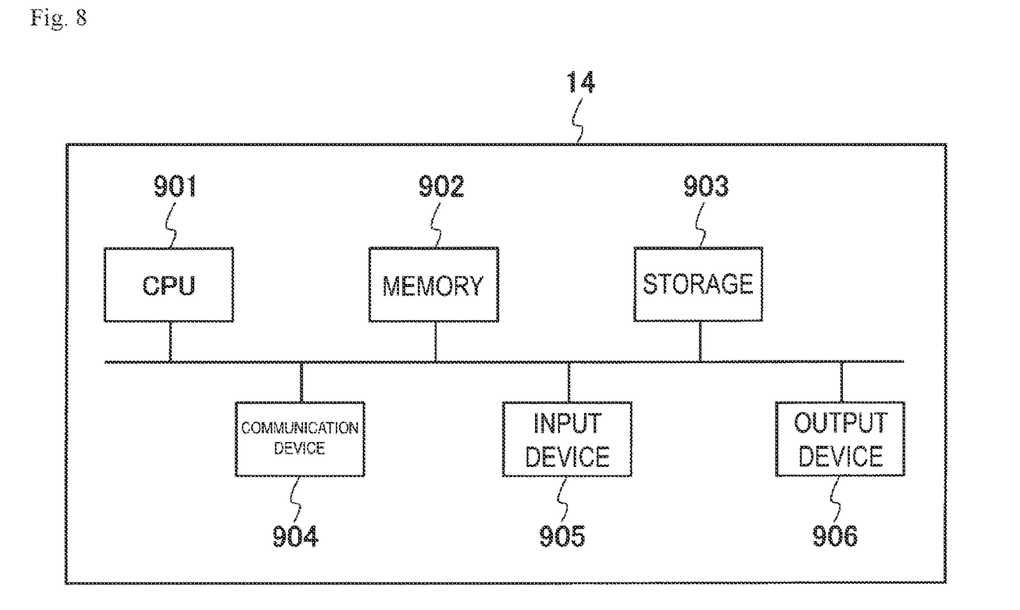
FIG. 8 is a block diagram illustrating a hardware configuration of the traffic application amount calculation device.

In addition, as illustrated in FIG. 8, the traffic application amount calculation device 14 according to the present embodiment can use a general-purpose computer system including, for example, a CPU 901, a memory 902, a storage 903 such as a hard disk drive (HDD) or a solid state drive (SSD), a communication device 904, an input device 905, and an output device 906. The memory 902 and the storage 903 are storage devices. In the computer system, each function of the traffic application amount calculation device 14 is implemented by the CPU 901 executing a predetermined program loaded on the memory 902.

Meanwhile, the traffic application amount calculation device 14 may be implemented in one computer or may be implemented in a plurality of computers. In addition, the traffic application amount calculation device 14 may be a virtual machine which is implemented in a computer. A program for the traffic application amount calculation device 14 can be stored in a computer readable recording medium such as an HDD, an SSD, a universal serial bus (USB) memory, a compact disc (CD), or a digital versatile disc (DVD), or can be delivered through a network.

REFERENCE SIGNS LIST

1 Topology estimation system
11 Traffic collection device
12 Topology estimation device
13 Traffic application IF determination device
14 Traffic application amount calculation device
15 Traffic application device
141 First storage unit
142 Second storage unit
143 Calculation unit
144 Comparison unit
145 First arithmetic operation unit
146 Second arithmetic operation unit
147 Transmission unit

The invention claimed is:

1. A traffic application amount calculation device comprising:
   a calculation unit, implemented with one or more processors, configured to calculate, using traffic data flowing to an interface (IF) of a network (NW) device, an average traffic amount in a transmission direction and an average traffic amount in a reception direction;
   a first arithmetic operation unit, implemented with one or more processors, configured to select a direction where the average traffic amount is smaller out of the transmission direction and the reception direction, and to calculate a standard deviation of a traffic amount in a selected direction that is selected; and
   a second arithmetic operation unit, implemented with one or more processors, configured to determine the traffic amount obtained by multiplying the standard deviation by a predetermined value as a traffic application amount to be applied to traffic in the selected direction.

2. The traffic application amount calculation device according to claim 1, wherein the second arithmetic operation unit is configured to determine, in a case where the traffic application amount exceeds an upper limit amount of a NW band of the IF, a value obtained by subtracting a maximum value of the traffic amount flowing in the selected direction from the upper limit amount as the traffic application amount.

3. The traffic application amount calculation device according to claim 2, further comprising a storage device configured to store the traffic application amount as traffic information,
   wherein the traffic information, IF information of the IF, the IF where the traffic having the traffic application amount is being applied, and a time of determining the traffic application amount are associated with each other.

4. A traffic application amount calculation method that is performed by a traffic application amount calculation device, the method comprising:
   calculating, by a traffic application amount calculation device, using traffic data flowing to an interface (IF) of a network (NW) device, an average traffic amount in a transmission direction and an average traffic amount in a reception direction;
   selecting, by the traffic application amount calculation device, a direction where the average traffic amount is smaller out of the transmission direction and the reception direction;
   calculating, by the traffic application amount calculation device, a standard deviation of a traffic amount in a selected direction that is selected; and
   determining, by the traffic application amount calculation device, the traffic amount obtained by multiplying the standard deviation by a predetermined value as a traffic application amount to be applied to traffic in the selected direction.

5. The traffic application amount calculation method according to claim 4, further comprising:
   determining, by a second arithmetic operation unit, in a case where the traffic application amount exceeds an upper limit amount of a NW band of the IF, a value obtained by subtracting a maximum value of the traffic amount flowing in the selected direction from the upper limit amount as the traffic application amount.

6. The traffic application amount calculation method according to claim 5, further comprising:
   storing, by a storage device, the traffic application amount as traffic information,
   wherein the traffic information, IF information of the IF, the IF where the traffic having the traffic application amount is being applied, and a time of determining the traffic application amount are associated with each other.

7. A non-transitory, computer-readable medium storing one or more instructions executable by a computer system to perform operations comprising:
   calculating, using traffic data flowing to an interface (IF) of a network (NW) device, an average traffic amount in a transmission direction and an average traffic amount in a reception direction;
   selecting a selected direction where the average traffic amount is smaller out of the transmission direction and the reception direction;
   calculating a standard deviation of a traffic amount in the selected direction; and
   determining the traffic amount obtained by multiplying the standard deviation by a predetermined value as a traffic application amount to be applied to traffic in the selected direction.

8. The non-transitory, computer-readable medium according to claim 7, further comprising operations of:
   determining, in a case where the traffic application amount exceeds an upper limit amount of a NW band of the IF, a value obtained by subtracting a maximum value of the traffic amount flowing in the selected direction from the upper limit amount as the traffic application amount.

9. The non-transitory, computer-readable medium according to claim 8, further comprising operations of:
storing the traffic application amount as traffic information,
wherein the traffic information, IF information of the IF, the IF where the traffic having the traffic application amount is being applied, and a time of determining the traffic application amount are associated with each other.

* * * * *